US 9,218,580 B2

(12) United States Patent
Libal et al.

(10) Patent No.: US 9,218,580 B2
(45) Date of Patent: Dec. 22, 2015

(54) DETECTING RETAIL SHRINKAGE USING BEHAVIORAL ANALYTICS

(75) Inventors: Vit Libal, Morristown, NJ (US); Jana Trojanova, Morristown, NJ (US); Lalitha M. Eswara, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 523 days.

(21) Appl. No.: 12/981,922

(22) Filed: Dec. 30, 2010

(65) Prior Publication Data

US 2012/0169879 A1   Jul. 5, 2012

(51) Int. Cl.
| | |
|---|---|
| *H04N 7/18* | (2006.01) |
| *G06N 5/02* | (2006.01) |
| *G06Q 10/06* | (2012.01) |
| *G08B 13/194* | (2006.01) |
| *G08B 13/196* | (2006.01) |
| *G08B 13/16* | (2006.01) |
| *G07G 3/00* | (2006.01) |
| *G06Q 20/20* | (2012.01) |
| *G06Q 30/06* | (2012.01) |

(52) U.S. Cl.
CPC ............. *G06Q 10/063* (2013.01); *G06Q 20/20* (2013.01); *G06Q 30/06* (2013.01); *G07G 3/003* (2013.01); *G08B 13/1672* (2013.01); *G08B 13/194* (2013.01); *G08B 13/19613* (2013.01); *H04N 7/183* (2013.01)

(58) Field of Classification Search
CPC ................. H04N 7/183; G08B 13/194; G08B 13/19613; G08B 13/1672
See application file for complete search history.

(56) References Cited

U.S. PATENT DOCUMENTS

| | | | |
|---|---|---|---|
| 18,738 | A | 12/1857 | Griffen |
| 57,049 | A | 8/1866 | Sawyer |
| 272,734 | A | 2/1883 | McDonald |
| 6,236,736 | B1 * | 5/2001 | Crabtree et al. ............. 382/103 |
| 7,409,076 | B2 | 8/2008 | Brown et al. |
| 7,448,542 | B1 | 11/2008 | Bobbitt et al. |
| 7,468,662 | B2 | 12/2008 | Velipasalar et al. |
| 7,503,490 | B1 * | 3/2009 | Bobbitt et al. ............... 235/383 |
| 7,516,888 | B1 | 4/2009 | Kundu et al. |
| 7,529,388 | B2 | 5/2009 | Brown et al. |
| 8,295,542 | B2 * | 10/2012 | Albertson et al. ............ 382/103 |

(Continued)

OTHER PUBLICATIONS

Haritaoglu, et al., "Detection and Tracking of Shopping Groups in Stores," IEEE Computer Society Conference on Computer Vision and Pattern Recognition (2001) I-431-I-438 vol. 1.*

(Continued)

*Primary Examiner* — Nhon Diep
*Assistant Examiner* — Jill Sechser
(74) *Attorney, Agent, or Firm* — Brooks, Cameron & Huebsch, PLLC (57) ABSTRACT

Methods, devices, and systems for detecting retail shrinkage using behavior analytics are described herein. The retail shrinkage may be due to, for example, sweethearting, although embodiments of the present disclosure are not so limited and can be used to detect other forms of retail shrinkage as well. One or more device embodiments include a memory, and a processor coupled to the memory. The processor is configured to execute executable instructions stored in the memory to receive data associated with behavior of an individual and use the data associated with the behavior of the individual to determine whether the behavior of the individual is irregular to detect retail shrinkage.

18 Claims, 4 Drawing Sheets

(56) References Cited

U.S. PATENT DOCUMENTS

| | | | |
|---|---|---|---|
| 8,564,661 B2* | 10/2013 | Lipton | G08B 13/19608 348/143 |
| 2005/0102183 A1* | 5/2005 | Kelliher et al. | 705/16 |
| 2006/0245622 A1* | 11/2006 | Tedesco | G08B 13/196 382/115 |
| 2007/0282665 A1* | 12/2007 | Buehler et al. | 705/10 |
| 2009/0006286 A1* | 1/2009 | Angell et al. | 706/12 |
| 2009/0115849 A1* | 5/2009 | Landers et al. | 348/150 |
| 2009/0226099 A1* | 9/2009 | Kundu et al. | 382/224 |
| 2011/0257985 A1* | 10/2011 | Goldstein | G06F 17/30256 705/1.1 |
| 2012/0008819 A1* | 1/2012 | Ding et al. | 382/100 |

OTHER PUBLICATIONS

Arentze, et. al., "Using Decision Tree Induction System for Modeling Space-Time Behavior," Geographical Analysis, vol. 32, No. 4 (Oct. 2000.*

Tian, et al., IBM smart surveillance system (S3): event based video surveillance system with an open and extensible framework, Machine Vision and Applications (2008) 19:315-327.

Kjeldsen, Polar Touch Detection, Interact, 2007 Bei-jing, China, Jul. 2007 (5 pgs.).

A.W. Senior, et al., Video analytics for retail, in Proceedings of the 2007 IEEE Conference on Advanced Video and Signal Based Surveillance (Sep. 5-7, 2007), AVSS, IEEE Computer Soceity, Washington, DC 423-428.1.

Quanfu Fan, et al., Detecting sweethearting in retail surveillance videos, In Proceedings of the 2009 IEEE international Conference on Acoustics, Speech and Signal Processing (Apr. 19-24, 2009) ICASSP, IEEE Computer Soceity, Washiongton, DC, 1449-1452.

Q. Fan, et al., Recognition of repetitive sequential human activity, cvpr, pp. 943-950, 2009 IEEE Conference on Computer Vision and Pattern Recognition, 2009.

Q.Fan, et al., Fast detection of retail fraud using polar touch buttons, In Proceedings of the 2009 IEEE international Conference on Multimedia and Expo (New York, NY, USA, Jun. 28-Jul. 3, 2009), IEEE Press, Piscataway, NJ, 1266-1269.

P.L. Venetianer, et al., Video verification of point of sale transactions, In Proceedings of the 2007 IEEE Conference on Advanced Video and Signal Based Surveillance (Sep. 057-07, 2007), AVSS, IEEE Computer Society, Washington, DC, 411-416.

P.K. Turaga, et al., Machine Recognition of Human Activities: A Survey, CirSysVideo(18), No. 11, Nov. 2008, pp. 1473-1488.

A. Amir, et al., Advances in Phonetic Word Spotting, Conference on Information and Knowlegde Management, Atlanta, USA, 2001.

* cited by examiner

DETECTING RETAIL SHRINKAGE USING BEHAVIORAL ANALYTICS

TECHNICAL FIELD

The present disclosure relates to methods, devices, and systems for detecting retail shrinkage using behavior analytics.

BACKGROUND

Retail shrinkage can be a large problem for retail merchants (e.g., stores). For example, retail merchants may lose a significant amount of money due to retail shrinkage. Accordingly, detecting and/or preventing this retail shrinkage may be desirable for retail merchants.

Retail shrinkage can include and/or refer to, for example, the theft of retail goods, fraudulent or unintentionally erroneous retail transactions, and/or sweethearting, among other types of retail shrinkage causes. As an example, point of sale (POS) personnel (e.g., cashiers), among other individuals, can be involved with retail fraud. For instance, POS personnel at a POS site in a store may permit an individual (e.g., a friend or family member of the POS personnel) to move through the POS site with retail goods from the store without paying for the goods or after paying a reduced amount for the goods.

Retail merchants can attempt to detect retail shrinkage at a POS site by monitoring and/or analyzing the characteristics of transactions that take place at the POS site. For example, retail merchants can attempt to detect retail shrinkage at a POS site by generating a log of transactions that take place at the POS site, detecting bar code scans that take place at the POS site, and comparing the bar code scans (e.g., the time the bar code scans occur) at the POS site with the transaction log for the POS site. As an additional example, retail merchants can use video to count goods sold at a POS, and compare the number of goods sold at the POS with the transaction log for the POS site. As a further example, retail merchants can use video to identify goods sold at a POS site, and compare the identifications of the goods with the transaction log for the POS site.

DETAILED DESCRIPTION

Methods, devices, and systems for detecting retail shrinkage using behavior analytics are described herein. The retail shrinkage may be due to, for example, sweethearting, although embodiments of the present disclosure are not so limited and can be used to detect other forms of retail shrinkage as well. One or more device embodiments include a memory, and a processor coupled to the memory. The processor is configured to execute executable instructions stored in the memory to receive data associated with behavior of an individual and use the data associated with the behavior of the individual to determine whether the behavior of the individual is irregular to detect retail shrinkage.

One or more embodiments of the present disclosure can detect retail shrinkage using (e.g., monitoring and/or analyzing) the behavior of a number of individuals (e.g., data associated with the behavior of the number of individuals). For example, one or more embodiments of the present disclosure can detect sweethearting using the behavior analysis of a number of individuals during a transaction at a point of sale (POS) site or other location. In contrast, previous approaches may detect retail shrinkage using the characteristics of a transaction at a POS site, as previously described herein.

As an additional example, one or more embodiments of the present disclosure can detect irregular behavior using a number of sensors placed appropriately to capture human behavior features, as will be further described herein. In such embodiments, the irregular behavior can be captured using behavior analytics alone, based on a behavioral model.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of individuals" can refer to one or more individuals.

Figure 1:
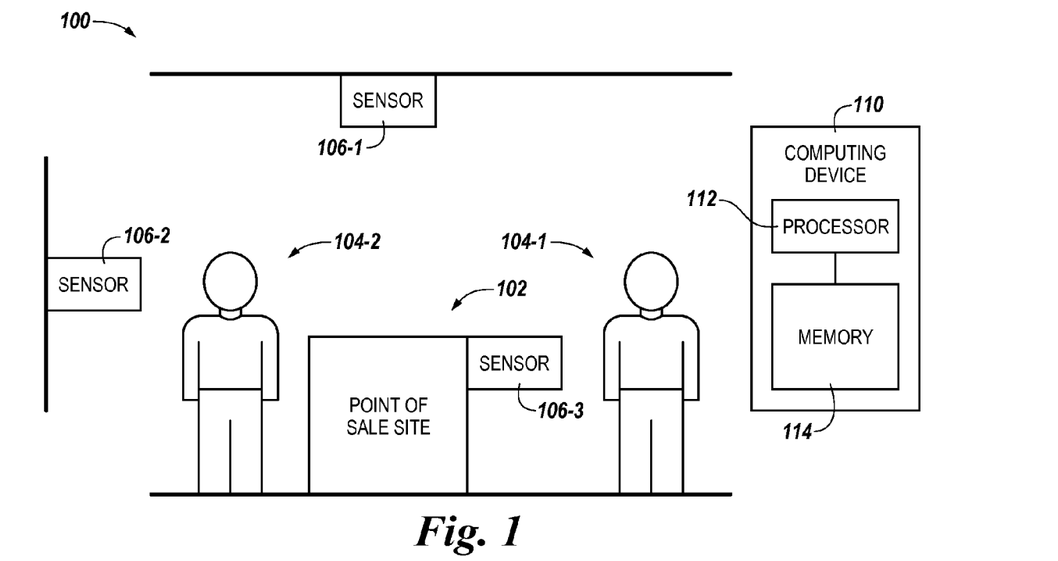
FIG. 1 illustrates a system for detecting retail shrinkage at a point of sale site in accordance with one or more embodiments of the present disclosure.

FIG. 1 illustrates a system 100 for detecting retail shrinkage at a point of sale (POS) site 102 in accordance with one or more embodiments of the present disclosure. Retail shrinkage can include and/or refer to, for example, the theft of retail goods, fraudulent or unintentionally erroneous retail transactions, and/or sweethearting, among other types of retail shrinkage causes, at the POS site or elsewhere as the case may be. In one or more embodiments, part or all of system 100 can be located at a retail site, such as, for example, a store, among other types of retail sites.

As shown in FIG. 1, system 100 includes a point of sale site 102. Point of sale (POS) site 102 can be, for example, a location in the retail site where transactions for retail goods take place. For instance, POS site 102 can be a check-out area of a store. POS site 102 can include, for example, a POS terminal (e.g., a cash register), a scanner, a counter, a conveyor belt, and/or a credit card reader (not shown in FIG. 1), among other items. However, embodiments of the present disclosure are not limited to a particular POS site location or a particular item at the POS.

As shown in FIG. 1, system 100 includes individuals 104-1 and 104-2. Individuals 104-1 and 104-2 can be located at, adjacent to, and/or near POS site 102, as illustrated in FIG. 1. Individual 104-1 can be, for example, an employee of the retail site (e.g., a POS personnel such as a cashier), and individual 104-2 can be, for example, a customer of the retail site.

Additionally, although two individuals (e.g., an employee and a customer) are shown in FIG. 1, embodiments of the present disclosure are not so limited, and can include any number of individuals. For example, system 100 can include additional customers and/or employees of the retail site located at, adjacent to, and/or near POS site 102.

As shown in FIG. 1, system 100 includes sensors 106-1, 106-2, and 106-3. In the embodiment illustrated in FIG. 1, sensor 106-1 is located overhead of (e.g., above) POS site 102 (e.g., on the ceiling of the retail site), sensor 106-2 is located to a side (e.g., the front) of POS site 102 (e.g., on a wall of the retail site), and sensor 106-3 is located at POS site 102 (e.g., attached to POS site 102). However, embodiments of the present disclosure are not limited to a particular location for sensors 106-1, 106-2, or 106-3. For example, sensors 106-1, 106-2, and 106-3 can be in any location at which they can sense behavior parameters used to build a behavioral model. Additionally, although three sensors are shown in FIG. 1, embodiments of the present disclosure are not so limited, and can include any number of sensors.

Sensors 106-1, 106-2, and/or 106-3 can be, for example, optical sensors (e.g., video cameras) and/or acoustic sensors (e.g., microphones), among other types of sensors. For example, in the embodiment illustrated in FIG. 1, sensors 106-1 and 106-2 can be optical sensors, and sensor 106-3 can be an acoustic sensor. However, embodiments of the present disclosure are not limited to a particular type of sensor.

Sensors 106-1, 106-2, and/or 106-3 can sense (e.g., detect, measure, collect, and/or record) data associated with the behavior of a number of individuals (e.g., individuals 104-1 and/or 104-2) during a number of transactions at POS site 102 (e.g., during a transaction at POS site 102 between individuals 104-1 and 104-2). The data can include, for example, color, texture, gradient, temporal, and/or spatial data, speech, and/or changes thereof, among other types of data. For example, if one or more of sensors 106-1, 106-2, and/or 106-3 are optical sensors, they can sense, capture, and/or record the data pertaining to the body motion of individuals 104-1 and/or 104-2 during the number of transactions at POS site 102, motion of items before billing, for example, on a conveyor belt where the items are kept for billing, or a bag from which the items are taken out for billing and other such actions that may indicate the place of item pick up by the cashier for billing purposes. The sensors can also capture data pertaining to the hand motion of the cashier during the billing process. The sensor can also capture data associated with the behavior of individuals 104-1 and/or 104-2 during the number of transactions at POS site 102, which can include, for example, data associated with the body motion of individuals 104-1 and/or 104-2 during the number of transactions at POS site 102, such as, for instance, body motion trajectory shape (e.g., the motion trajectory of a number of individual body parts fused together), body motion speed, the frequency of particular body motions, and/or the presence of body or any part of the body motion, among other types of body motion data.

If one or more of sensors 106-1, 106-2, and/or 106-3 are optical sensors, they can also sense the hand motion of individuals 104-1 and/or 104-2 during the number of transactions at POS site 102. That is, the data associated with the behavior of individuals 104-1 and/or 104-2 during the number of transactions at POS site 102 can include data associated with the hand motion of individuals 104-1 and/or 104-2 during the number of transactions at POS site 102, such as, for instance, hand motion trajectory shape (e.g., the way individuals 104-1 and/or 104-2 reach for and/or move items), hand motion speed, frequency of item pickup and/or scanning (e.g., the number of items picked up and/or scanned per minute), and/or hand gestures, among other types of hand motion data.

If one or more of sensors 106-1, 106-2, and/or 106-3 are optical sensors, they can also sense the interaction between individuals 104-1 and 104-2 during the number of transactions at POS site 102. That is, the data associated with the behavior of individuals 104-1 and/or 104-2 during the number of transactions at POS site 102 can include data associated with the interaction between individuals 104-1 and 104-2 during the number of transactions at POS site 102, such as, for instance, handshakes and/or handing of items, among other types of interaction data.

If one or more of sensors 106-1, 106-2, and/or 106-3 are optical sensors, they can also sense the facial expressions of individuals 104-1 and/or 104-2 during the number of transactions at POS site 102. That is, the data associated with the behavior of individuals 104-1 and/or 104-2 during the number of transactions at POS site 102 can include data associated with the facial expressions of individuals 104-1 and/or 104-2 during the number of transactions at POS site 102, such as, for instance, the presence of a specific facial expression (e.g., a smile) and/or the presence of speech, among other types of facial expressions.

If one or more of sensors 106-1, 106-2, and/or 106-3 are optical sensors, they can also sense the location of individuals 104-1 and/or 104-2 (e.g., the location of the body and/or hands of individuals 104-1 and/or 104-2) during the number of transactions at POS site 102. That is, the data associated with the behavior of individuals 104-1 and/or 104-2 during the number of transactions at POS site 102 can include data associated with the location of individuals 104-1 and/or 104-2 during the number of transactions at POS site 102, such as, for instance, the location of individuals 104-1 and/or 104-2 with respect to POS site 102 and/or elements of POS site 102, among other types of location data.

As an additional example, if one or more of sensors 106-1, 106-2, and/or 106-3 are acoustic sensors, they can sense, capture, and/or record the speech of individuals 104-1 and/or 104-2 during the number of transactions at POS site 102. That is, the data associated with the behavior of individuals 104-1 and/or 104-2 during the number of transactions at POS site 102 can include data associated with the speech of individuals 104-1 and/or 104-2 during the number of transactions at POS site 102, such as, for instance, the presence of speech, speech tone, speech volume, the presence of specific words, content of the speech, meaning of the spoken words, and/or speech expression, among other types of speech data.

As an additional example, if one or more of sensors 106-1, 106-2, and/or 106-3 are optical or acoustic sensors, they can sense the presence of an additional individual(s) (not shown in FIG. 1) during the number of transactions at POS site 102. That is, the data associated with the behavior of individuals 104-1 and/or 104-2 during the number of transactions at POS site 102 can include data associated with the presence of an additional individual(s) during the number of transactions at POS site 102. The presence of an additional individual(s) can be used with the data previously described herein (e.g., to determine whether individuals 104-1 and/or 104-2 are gesturing to themselves or to the additional individual(s)).

Embodiments of the present disclosure are not limited to the types of data described herein that can be associated with the behavior of individuals 104-1 and/or 104-2 during the number of transactions at POS site 102. Rather, embodiments of the present disclosure can include any type of data that can be associated with the behavior of individuals 104-1 and/or 104-2 during the number of transactions at POS site 102. That is, sensors can be used to provide any type of data that can be associated with the behavior of individuals 104-1 and/or 104-2 during the number of transactions at POS site 102.

As shown in FIG. 1, system 100 includes computing device 110. Computing device 110 can be located in the retail site at POS site 102 or away from (e.g., not at, near, or adjacent to) POS site 102. For example, computing device 110 can be located in a separate room from POS site 102 in the retail site. In some embodiments, computing device 110 can be located outside the retail site (e.g., in a different building than POS site 102).

As shown in FIG. 1, system 100 includes a processor 112 and a memory 114 coupled to processor 112. Memory 114 can be volatile or nonvolatile memory. Memory 114 can also be removable, e.g., portable memory, or non-removable, e.g., internal memory. For example, memory 114 can be random access memory (RAM) or read-only memory (ROM). Memory 114 can, for example, be dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 114 is illustrated as being located in computing device 110, embodiments of the present disclosure are not so limited. For example, memory 114 can also be located internal to another computing resource, e.g., enabling computer readable instructions to be downloaded over a network, such as the Internet, or another wired or wireless connection.

Memory 114 can store executable instructions, such as, for example, computer readable instructions (e.g., software). Processor 112 can execute the executable instructions stored in memory 114.

In one or more embodiments of the present disclosure, computing device 110 can receive (e.g., from sensors 106-1, 106-2, and/or 106-3) the data associated with the behavior of individuals 104-1 and/or 104-2 sensed by sensors 106-1, 106-2, and/or 106-3 during the number of transactions at POS site 102. For example, the data associated with the behavior of individuals 104-1 and/or 104-2 sensed by sensors 106-1, 106-2, and/or 106-3 during the number of transactions at POS site 102 can be converted to a digital form and sent to computing device 110.

Computing device 110 can receive the data associated with the behavior of individuals 104-1 and/or 104-2 via a network (not shown in FIG. 1), such as, for example, a wide area network (WAN) such as the Internet, a local area network (LAN), a personal area network (PAN), a campus area network (CAN), or metropolitan area network (MAN), among other types of networks. As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Computing device 110 can use (e.g., analyze) the data associated with the behavior of individuals 104-1 and/or 104-2 sensed by sensors 106-1, 106-2, and/or 106-3 during the number of transactions at POS site 102 to determine whether the behavior of individuals 104-1 and/or 104-2 is irregular (e.g., fraudulent). For example, computing device 110 can have a behavior model in memory 114 and/or can establish a behavior model for one or more individuals 104-1 and/or 104-2, and compare the data associated with the behavior of individuals 104-1 and/or 104-2 to one or more established behavior models and/or stored behavior models to determine whether the behavior of individuals 104-1 and/or 104-2 is irregular.

Computing device 110 can establish a behavior model for individuals 104-1 and/or 104-2 by, for example, applying a pattern recognition method to additional (e.g., previously sensed) data associated with the behavior of individuals 104-1 and/or 104-2 previously sensed by sensors 106-1, 106-2, and/or 106-3 during additional (e.g., previous) transactions at POS site 102 known to be regular (e.g., non-fraudulent) and/or irregular (e.g., fraudulent). Additionally and/or alternatively, computing device 110 can establish a behavior model by, for example, applying the pattern recognition method to additional (e.g., previously sensed) data associated with the behavior of additional individuals during additional (e.g., previous) transactions at other POS sites known to be regular and/or irregular.

The pattern recognition method applied to the additional data to establish the behavior model can be, for example, a multi-layered, multi-level, hierarchical, adaptive, and/or online learning based method that can use higher levels of abstractness as non-linear components in the method. The pattern recognition method can also be, for example, a discriminative or representative method. In some embodiments, the one or more pattern recognition methods can be, for example, a supervised classification method (e.g., a Bayesian Classifier, a Support Vector Machine, or a Hidden Markov Model), a structural method of pattern recognition (e.g., Petri Nets or stochastic grammars), a knowledge and/or logic based method (e.g., Ontologies), a statistical parameter estimation method (e.g., an Expectation Maximization Method or a Gaussian Mixture Model), or an unsupervised classification method (e.g., multi-dimensional clustering), among other pattern recognition methods. However, embodiments of the present disclosure are not limited to a particular pattern recognition method.

In some embodiments, the pattern recognition method can use the additional data to recognize a level of abstractness within an activity or behavior. That is, the pattern recognition method can distinguish between different degrees of an activity or behavior. For example, the pattern recognition can recognize whether a handshake is light or strong.

In instances in which the additional data used to establish the behavior model for individuals 104-1 and/or 104-2 is sensed during additional transactions known to be regular (e.g., non-fraudulent), the established behavior model may include a behavior pattern associated with regular behavior of individuals 104-1 and/or 104-2. Regular behavior can include, for example, any type of behavior that may be associated with a non-fraudulent transaction, such as, for instance, a verbal greeting between individuals 104-1 and 104-2, general body and/or hand motion of individuals 104-1 and/or 104-2 remaining within particular trajectory boundaries, items being scanned by individuals 104-1 and/or 104-2 within a particular frequency range, and/or individuals 104-1 and/or 104-2 remaining in the same location during the transaction, among other types of behavior. In such instances, the data associated with the behavior of individuals 104-1 and/or 104-2 sensed by sensors 106-1, 106-2, and/or 106-3 during the number of transactions at POS site 102 may be compared to the behavior pattern associated with the regular behavior of individuals 104-1 and/or 104-2; and if the data associated with the behavior of individuals 104-1 and/or 104-2 sensed by sensors 106-1, 106-2, and/or 106-3 during the number of transactions at POS site 102 does not fit within the behavior pattern associated with the regular behavior of individuals 104-1 and/or 104-2, the behavior of individuals 104-1 and/or 104-2 may be determined to be irregular (e.g., fraudulent).

In instances in which the additional data used to establish the behavior model for individuals 104-1 and/or 104-2 is sensed during additional transactions known to be irregular (e.g., fraudulent), the established behavior model may include a behavior pattern associated with irregular behavior of individuals 104-1 and/or 104-2. Irregular behavior can include, for example, any type of behavior that may be associated with a fraudulent transaction, such as, for instance, a handshake or signal between individuals 104-1 and 104-2, body and/or hand motion of individuals 104-1 and/or 104-2 that is outside particular trajectory boundaries, items being scanned by individuals 104-1 and/or 104-2 outside of a particular spatial and/or frequency range, and/or individuals 104-1 and/or 104-2 not remaining in the same location (e.g., moving around) during the transaction, among other types of behavior. In such instances, the data associated with the behavior of individuals 104-1 and/or 104-2 sensed by sensors 106-1, 106-2, and/or 106-3 during the number of transactions at POS site 102 may be compared to the behavior pattern associated with the irregular behavior of individuals 104-1 and/or 104-2; and if the data associated with the behavior of individuals 104-1 and/or 104-2 sensed by sensors 106-1, 106-2, and/or 106-3 during the number of transactions at POS site 102 fits within the behavior pattern associated with the irregular behavior of individuals 104-1 and/or 104-2, the behavior of individuals 104-1 and/or 104-2 may be determined to be irregular (e.g., fraudulent).

The comparison of the data associated with the behavior of individuals 104-1 and/or 104-2 sensed by sensors 106-1, 106-2, and/or 106-3 during the number of transactions at POS site 102 and the established behavior model can be done by an inference engine stored in memory, e.g., memory 114. For example, the inference engine can use the established behavior models along with heuristics and scene context information. Scene context information can include, for example, marked regions of interest of individuals 104-1 and/or 104-2 and/or POS site 102, and/or multi-sensor tracking of individuals 104-1 and/or 104-2.

In some embodiments, computing device 110 can assign a confidence (e.g., a threshold) value to the data associated with the behavior of individuals 104-1 and/or 104-2 sensed by sensors 106-1, 106-2, and/or 106-3 during the number of transactions at POS site 102. The assigned confidence value can be used to determine a weighted average of the data associated with the behavior of individuals 104-1 and/or 104-2, and the weighted average can be used in the determination of whether the behavior of individuals 104-1 and/or 104-2 is irregular (e.g., fraudulent).

In some embodiments, computing device 110 can use a transaction log associated with POS site 102 in conjunction with the data associated with the behavior of individuals 104-1 and/or 104-2 sensed by sensors 106-1, 106-2, and/or 106-3 during the number of transactions at POS site 102 to determine whether the behavior of individuals 104-1 and/or 104-2 is irregular (e.g., fraudulent). For example, computing device 110 can use data collected and/or stored in the transaction log during the number of transactions at POS site 102 (e.g., data indicating the identity of items scanned during the number of transactions and/or when the items were scanned) in conjunction with the data associated with the behavior of individuals 104-1 and/or 104-2 to determine whether the behavior of individuals 104-1 and/or 104-2 is irregular.

If computing device 110 determines that the behavior of individuals 104-1 and/or 104-2 during the number of transactions at POS site 102 is irregular (e.g., fraudulent), computing device can initiate a corrective action in some embodiments. For example, if computing device 110 determines that the behavior of individuals 104-1 and/or 104-2 is irregular, computing device 110 can be designed to generate a report of the number of transactions. That is, the corrective action can include generating the report of the number of transactions. The report can then be reviewed by security staff of the retail site (e.g., to confirm that the number of transactions were fraudulent).

As an additional example, if computing device 110 determines that the behavior of individuals 104-1 and/or 104-2 during the number of transactions at POS site 102 is irregular (e.g., fraudulent), computing device 110 can be designed to instruct sensors 106-1, 106-2, and/or 106-3 to record the number of transactions, and sensors 106-1, 106-2, and/or 106-3 can record the number of transactions in response to receiving the instruction. That is, the corrective action can include instructing sensors 106-1, 106-2 and/or 106-3 to record the number of transactions, and/or the recording of the number of transactions by sensors 106-1, 106-2, and/or 106-3 in response to receiving the instruction. The recording of the number of transactions can then be reviewed by security staff of the retail site (e.g., to confirm that the number of transactions were fraudulent). Computing device 110 can, for example, send the instructions to sensors 106-1, 106-2, and/or 106-3 via the network previously described herein.

As an additional example, if computing device 110 determines that the behavior of individuals 104-1 and/or 104-2 during the number of transactions at POS site 102 is irregular (e.g., fraudulent), computing device 110 can be designed to provide a security alert to security staff of the retail site (e.g., to a computing device of the security staff). That is, the corrective action can include providing the security alert to the security staff.

In some embodiments, computing device 110 can initiate the corrective action (e.g., provide a security alert to security staff) if the frequency of the number of transactions at POS site 102 during which the behavior of individuals 104-1 and/or 104-2 is determined to be regular or irregular is above or below a pre-defined threshold, frequency, or frequency range. For example, if computing device 110 determines that the behavior of individuals 104-1 and/or 104-2 is irregular during at least 10% of the number of transactions at POS site 102, computing device 110 can initiate the corrective action.

Figure 2:
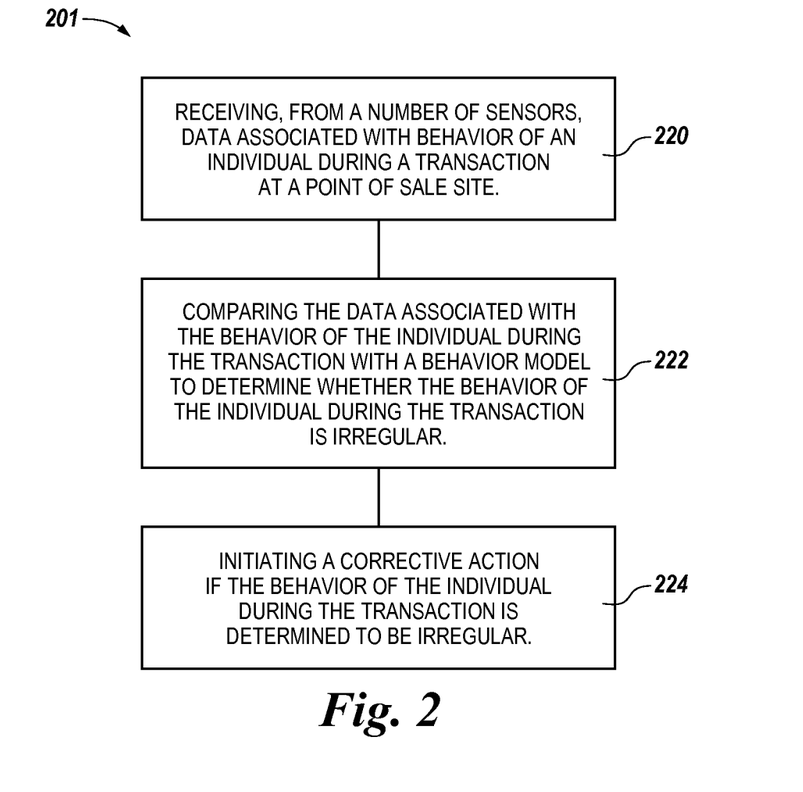
FIG. 2 illustrates a method for detecting retail shrinkage in accordance with one or more embodiments of the present disclosure.

FIG. 2 illustrates a method 201 for detecting retail shrinkage in accordance with one or more embodiments of the present disclosure. The method can be performed by a computing device, such as, for example, computing device 110 previously described in connection with FIG. 1.

At block 220, method 201 includes receiving, from a number of sensors, data associated with behavior of an individual during a transaction at a point of sale site. The number of sensors can be, for example, sensors 106-1, 106-2, and/or 106-3 previously described in connection with FIG. 1. The individual can be, for example, individual 104-1 or 104-2 previously described in connection with FIG. 1. The point of sale site can be, for example, POS site 102 previously described in connection with FIG. 1. The data associated with the behavior of the individual during the transaction at the point of sale site can be analogous to the data associated with the behavior of individuals 104-1 and/or 104-2 during the number of transactions at POS site 102 previously described in connection with FIG. 1.

At block 222, method 201 includes comparing the data associated with the behavior of the individual during the transaction with a behavior model to determine whether the behavior of the individual during the transaction is irregular. The behavior model and comparison can be analogous to one or more of the behavior models and comparisons, respectively, previously described in connection with FIG. 1. That is, method 201 can include determining a behavior model based on data received from the number of sensors for regular and irregular transactions, and then comparing the data associated with the behavior of the individual during the transaction with the behavior model.

Irregular behavior can be, for example, fraudulent behavior, as previously described herein. The determination of whether the behavior of the individual during the transaction is irregular can be analogous to the determination of whether the behavior of individuals 104-1 and/or 104-2 during the number of transactions at POS site 102 is irregular previously described in connection with FIG. 1.

At block 224, method 201 includes initiating a corrective action if the behavior of the individual during the transaction is determined to be irregular. The corrective action can be analogous to the corrective action previously described in connection with FIG. 1.

Figure 3:
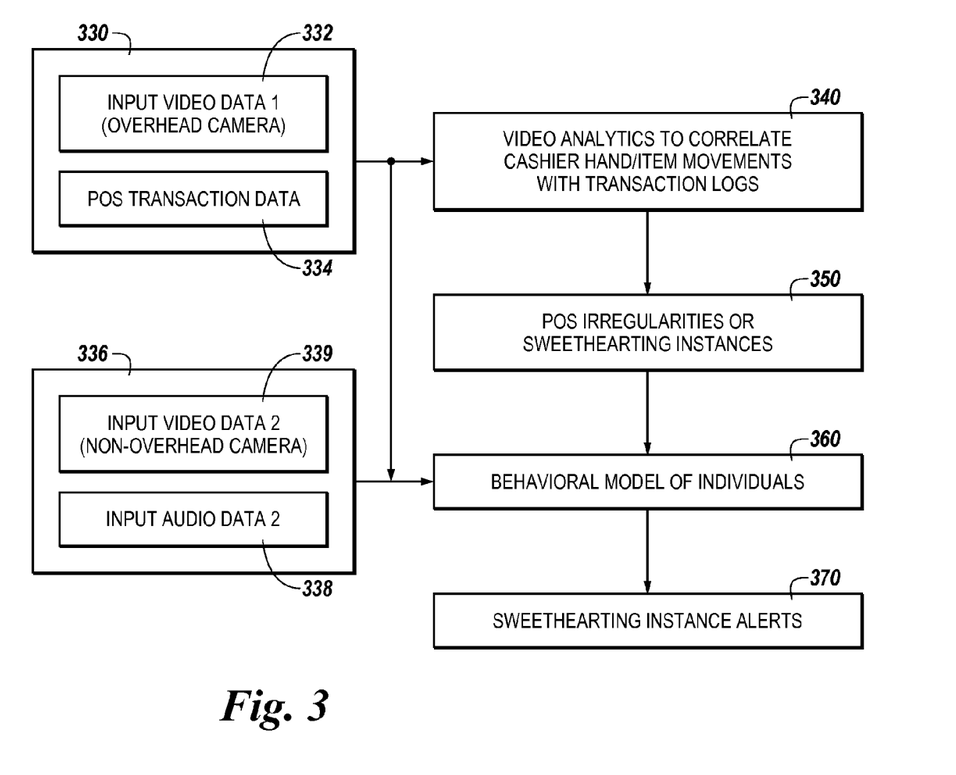
FIG. 3 illustrates a decision system in accordance with one or more embodiments of the present disclosure.

FIG. 3 illustrates a decision system in accordance with one or more embodiments of the present disclosure. The decision system can be performed by a computing device, such as, for example, computing device 110 previously described in connection with FIG. 1.

The decision system can be used to determine whether a transaction is irregular (e.g., whether the behavior of an individual, such as individuals 104-1 and/or 104-2 previously described in connection with FIG. 1 during the transaction is irregular). The decision system can be used, for example, at a point of sale (POS) site (e.g., POS site 102 previously described in connection with FIG. 1) when the POS transaction log data illustrated at block 334 is available. Additionally, the decision system can be used for other types of retail shrinkage detection using behavioral analytics that are based on human behavior captured by a number of sensors (e.g., sensors 106-1, 106-2, and/or 106-3 previously described in connection with FIG. 1).

The decision system can use a behavior model (e.g., the behavior models previously described in connection with FIG. 1 and/or further described herein) and transaction log data to provide a sweethearting alert and/or determine whether a transaction is irregular. At block 330 (e.g., blocks 332 and 334 in block 330), an optical sensor (e.g., video camera) located overhead of the POS site captures a scanning operation by a cashier and the corresponding operation that enters transaction log data in a video stream. Block 334 is a system that captures transaction log data at the POS.

Inputs from block 300 can be used to perform video analytics such as, for example, cashier's hand motion analysis, trajectory analysis, and/or item pick up and drop analysis. This information is correlated with POS information and regular and irregular scan modeling and the transaction logs at block 340, and initial irregularities and/or sweethearting instances are reported at block 350.

At block 360, behavior models of individuals are built using additional inputs from block 336. The behavior models can be built using pattern recognition methods previously described herein (e.g., in connection with FIG. 1). Block 336 includes an acoustic (e.g., audio) sensor, from which features indicating, for example, the presence of speech, speech tone, volume, words, etc. as previously described herein are captured in block 338 and analyzed for building the behavior model. Bodily actions of the individuals, such as, for example, motion, body part motion, hand motion, and/or trajectories of the individuals as previously described herein are captured and analyzed using a optical (e.g., video) sensor in block 339. The optical sensor may be at a location other than overhead the POS.

The behavior models built at block 360 may include two classes. The first class is a regular model that defines non-sweethearting instances and/or regular transactions, and the second class is an irregular model that defines a sweethearting instance and/or an irregular transaction. A learning mechanism leading to a decision system is incorporated at block 370 to analyze the patterns and indicate inconsistencies. The learning mechanism and/or pattern recognition method may be analogous to one or more embodiments previously described herein.

Figure 4:
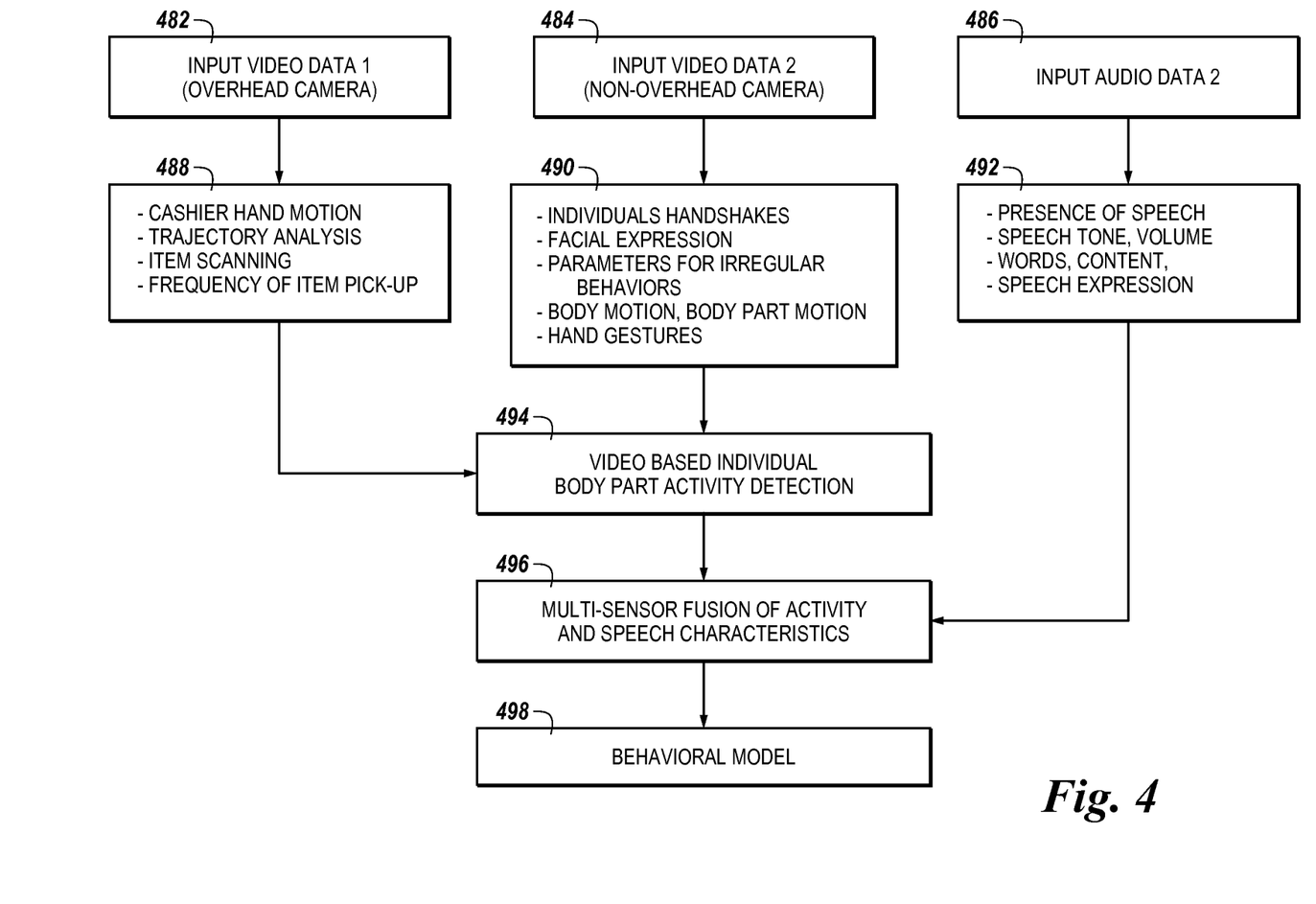
FIG. 4 illustrates a method for building a behavior model using a pattern recognition approach in accordance with one or more embodiments of the present disclosure.

FIG. 4 illustrates a method for building a behavior model (e.g., a behavior model analogous to the behavior models previously described herein) using a pattern recognition approach in accordance with one or more embodiments of the present disclosure. The method can be performed by a computing device, such as, for example, computing device 110 previously described in connection with FIG. 1.

At blocks 482 and 484, an optical sensor (e.g., video camera) located overhead of a POS site and an optical sensor at a location other than overhead the POS site, respectively, can be used to detect activities of the body and/or body part motion of a number of individuals. The optical sensors can be, for example, sensors 106-1 and 106-2, respectively, previously described in connection with FIG. 1, the POS site can be, for example, POS site 102 previously described in connection with FIG. 1, and the individuals can be, for example, individuals 104-1 and/or 104-2 previously described in connection with FIG. 1. Some of the primitive activities detected using these optical sensors include, for example, hand movement (e.g., of the cashier), trajectory analysis, item scanning, frequency of item pickup, body and body part motion and tracking of the individuals, presence of speech, facial expression analysis, handshakes, hand gestures, and profiling body movements and other actions, as shown at blocks 488 and 490 and previously described herein.

At block 486, an audio sensor (e.g., sensor 106-3 previously described in connection with FIG. 1) can be used to detect speech, words, tone of speech, audio expression, and other such events indicating the speech of the individuals as previously described herein. For example, some of the primitives that are detected using this audio sensor include speech presence, tone, volume, words, content, and expression, as shown at block 492.

It should be noted that the primitives included in blocks 488, 490, and 492 are illustrative, and embodiments of the present disclosure are not limited to these primitives. For example, the primitives can also include adjacent or derived primitives. It is to be noted that the behavior model may contain some or all the above said primitives or their adjacent or derived primitives as applicable.

At block 494, the primitives are used in video based body part motion and activity detection and analysis. The body part or individual motion data is then fused with the data from the audio sensor, leading to multi-level (e.g., multi-sensor) fusion of various primitives (e.g., activity and speech characteristics) at block 496. The fusion output (e.g., result) is the behavior model at block 498, which can be, for example, the behavior model previously described herein (e.g., with respect to FIG. 1).

Behavior models can be built separately for regular and irregular transactions over time. The built models may be representative models or discriminative models, as indicated in the pattern recognition method previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for detecting retail shrinkage, comprising:
    a memory; and
    a processor coupled to the memory, wherein the processor is configured to execute executable instructions stored in the memory to:
        receive data associated with behavior of an individual, wherein the data associated with the behavior of the individual includes:
            data associated with hand motion of a customer at a point of sale site;
            data associated with body motion or body part motion of the customer at the point of sale site, wherein the body motion or body part motion is in addition to the hand motion; and
            data associated with a facial expression of the customer at the point of sale site;
        establish a behavior model for the individual by applying a pattern recognition method to additional data associated with the behavior of the individual during additional transactions at the point of sale site and by applying the pattern recognition method to data associated with behavior of additional individuals during additional transactions at other point of sale sites; and
        use the data associated with the behavior of the individual and the behavior model to determine whether the behavior of the individual is irregular to detect retail shrinkage.

2. The computing device of claim 1, wherein the processor is configured to execute executable instructions stored in the memory to:
    compare the data associated with the behavior of the individual to the established behavior model to determine whether the behavior of the individual is irregular to detect retail shrinkage.

3. The computing device of claim 1, wherein the data associated with the behavior of the individual includes data associated with a number of items, scanning of a number of items, or a transaction log.

4. The computing device of claim 1, wherein the data associated with the behavior of the individual includes data associated with speech of the customer, including speech presence, content, tone, volume, words, and expression.

5. A computer implemented method for detecting retail shrinkage, comprising:
    receiving, from a number of sensors, data associated with behavior of an individual during a transaction at a point of sale site, wherein the data associated with the behavior of the individual includes:
        data associated with hand motion of a customer at the point of sale site, wherein the data associated with the hand motion of the customer at the point of sale site includes data associated with a handshake between the customer and an employee at the point of sale site; and
        data associated with body motion or body part motion of the customer at the point of sale site, wherein the body motion or body part motion in is addition to the hand motion;
    establishing a behavior model based on data received from the number of sensors for regular and irregular transactions and by applying a pattern recognition method to additional data associated with the behavior of the individual during additional transactions at the point of sale site and applying the pattern recognition method to data associated with behavior of additional individuals during additional transactions at other point of sale sites;
    comparing the data associated with the behavior of the individual during the transaction with the behavior model to determine whether the behavior of the individual during the transaction is irregular; and
    initiating a corrective action if the behavior of the individual during the transaction is determined to be irregular.

6. The method of claim 5, wherein the additional data is received from the number of sensors.

7. The method of claim 5, wherein the pattern recognition method is a multi-layer, hierarchal, adaptive, online learning based pattern recognition method, a discriminative pattern recognition method, or a representative pattern recognition method.

8. The method of claim 5, wherein the pattern recognition method uses the additional data to recognize a level of abstractness within an activity or behavior.

9. The method of claim 5, wherein:
    the behavior model includes a behavior pattern associated with regular behavior of the individual; and
    the behavior of the individual during the transaction is irregular if the data associated with the behavior of the individual during the transaction does not fit within the behavior pattern associated with the regular behavior of the individual.

10. The method of claim 5, wherein:
    the behavior model includes a behavior pattern associated with irregular behavior of the individual; and the behavior of the individual during the transaction is irregular if the data associated with the behavior of the individual during the transaction fits within the behavior pattern associated with the irregular behavior of the individual.

11. The method of claim 5, wherein the behavior model uses body part motion or body motion of the individual in conjunction with speech expression, tone, volume, content, and item pickup for detection of sweethearting or fraud.

12. The method of claim 5, wherein initiating the corrective action includes generating a report of the transaction, instructing the number of sensors to record the transaction, or providing a security alert.

13. The method of claim 5, wherein the method includes:
receiving, from the number of sensors, data associated with behavior of the individual during a number of additional transactions at the point of sale site;
comparing the data associated with the behavior of the individual during the number of additional transactions with the behavior model to determine whether the behavior of the individual during the number of additional transactions is irregular; and
initiating the corrective action if a frequency of the number of transactions during which the behavior of the individual is determined to be irregular is above a pre-defined frequency.

14. The method of claim 5, wherein the method includes assigning a confidence value to the data associated with the behavior of the individual during the transaction.

15. A system for detecting retail shrinkage, comprising:
a number of sensors configured to sense data associated with behavior of a number of individuals at a point of sale site, wherein the data associated with the behavior of the number of individuals includes:
body motion of a customer at the point of sale site;
body part motion of the customer at the point of sale site;
hand motion of the customer at the point of sale site, wherein the hand motion is in addition to the body motion and body part motion and the hand motion includes a handshake between the customer and an employee at the point of sale site; and
a facial expression of the customer at the point of sale site and
a computing device configured to:
establish a behavior model for the number of individuals by applying a pattern recognition method to additional data associated with the behavior of the number of individuals during additional transactions at the point of sale site and by applying the pattern recognition method to data associated with behavior of additional individuals during additional transactions at other point of sale sites; and
use the sensed data associated with the behavior of the number of individuals at the point of sale site and the behavior model to determine whether the behavior of the number of individuals is irregular.

16. The system of claim 15, wherein the number of sensors includes an optical sensor and an acoustic sensor.

17. The system of claim 15, wherein the number of sensors include at least one of:
a video camera located overhead of the point of sale site;
a video camera located to a side of the point of sale site; and
a microphone located at the point of sale site.

18. The system of claim 15, wherein the data associated with the behavior of the number of individuals at the point of sale site includes data associated with an interaction between the number of individuals at the point of sale site.

* * * * *